United States Patent
Omi et al.

(10) Patent No.: US 7,982,618 B2
(45) Date of Patent: Jul. 19, 2011

(54) WAKEFULNESS MAINTAINING APPARATUS AND METHOD OF MAINTAINING WAKEFULNESS

(75) Inventors: Takuhiro Omi, Anjo (JP); Fumiya Nagai, Anjo (JP)

(73) Assignee: DENSO CORPORATION, Kariya (JP)

( * ) Notice: Subject to any disclaimer, the term of this patent is extended or adjusted under 35 U.S.C. 154(b) by 429 days.

(21) Appl. No.: 11/987,447

(22) Filed: Nov. 30, 2007

(65) Prior Publication Data

US 2008/0180257 A1   Jul. 31, 2008

(30) Foreign Application Priority Data

Jan. 29, 2007   (JP) ................................. 2007-018255

(51) Int. Cl.
*G08B 23/00* (2006.01)
*A61B 5/00* (2006.01)
*A61B 5/02* (2006.01)
*A61B 5/04* (2006.01)

(52) U.S. Cl. ............... 340/573.1; 340/573.2; 340/573.3; 340/573.4; 340/575; 340/576; 600/300; 600/301; 600/508; 600/509

(58) Field of Classification Search .......... 340/575–576, 340/573.1–573.4; 600/508–509, 300–301
See application file for complete search history.

(56) References Cited

U.S. PATENT DOCUMENTS

| | | | |
|---|---|---|---|
| 4,565,997 A * | 1/1986 | Seko et al. ................... | 340/576 |
| 5,311,877 A | 5/1994 | Kishi | |
| 5,574,641 A * | 11/1996 | Kawakami et al. .............. | 701/1 |
| 6,313,749 B1 | 11/2001 | Horne et al. | |
| 6,337,629 B1 * | 1/2002 | Bader .......................... | 340/576 |
| 6,661,345 B1 * | 12/2003 | Bevan et al. .................. | 340/575 |
| 6,974,414 B2 | 12/2005 | Victor | |
| 7,084,772 B2 | 8/2006 | Oyama | |
| 7,084,773 B2 | 8/2006 | Oyama | |
| 7,088,250 B2 * | 8/2006 | Yasushi ..................... | 340/573.1 |
| 7,460,940 B2 | 12/2008 | Larsson et al. | |
| 2005/0128092 A1 | 6/2005 | Bukman et al. | |

(Continued)

FOREIGN PATENT DOCUMENTS

DE   10 2004 036 119 A1   2/2006

(Continued)

OTHER PUBLICATIONS

Office Action dated Apr. 14, 2009 from Japan Patent office in the corresponding JP Application No. 2007-018255 (and English Translation).

(Continued)

*Primary Examiner* — Benjamin C Lee
*Assistant Examiner* — Lam P Pham
(74) *Attorney, Agent, or Firm* — Posz Law Group, PLC

(57) ABSTRACT

A wakefulness maintaining apparatus includes an event detecting part, a drowsiness level determining part, a threshold setting part, and a stimulus supplying part. The event detecting part detects an event related to a drowsiness of a person. The drowsiness level determining part determines a drowsiness level that changes in accordance with a strength of the drowsiness. The threshold setting part sets a threshold value to divide the drowsiness level into a first level range and a second level range in such a manner that the first level range is equal to or lower than the threshold value and the second level range is higher than the threshold value. The stimulus supplying part supplies a stimulus having an awaking effect to the person when the drowsiness level is in the second level range and the event is detected.

20 Claims, 5 Drawing Sheets

U.S. PATENT DOCUMENTS

| | | |
|---|---|---|
| 2009/0115589 A1 | 5/2009 | Galley et al. |
| 2009/0160631 A1 | 6/2009 | Galley et al. |

FOREIGN PATENT DOCUMENTS

| | | |
|---|---|---|
| GB | 2 385 451 A | 8/2003 |
| JP | U-62-17434 | 2/1987 |
| JP | A-05-096971 | 4/1993 |
| JP | A-05-184558 | 7/1993 |
| JP | A-06-197891 | 7/1994 |
| JP | A-06-233306 | 8/1994 |
| JP | A-08-293085 | 11/1996 |
| JP | A-9-19420 | 1/1997 |
| JP | A-10-198876 | 7/1998 |
| JP | A-10-198898 | 7/1998 |
| JP | A-10-250404 | 9/1998 |
| JP | A-10-272960 | 10/1998 |
| JP | A-11-310053 | 11/1999 |
| JP | A-2001-18717 | 1/2001 |
| JP | A-2001-194161 | 7/2001 |
| JP | A-2006-164147 | 6/2006 |
| JP | A-2006-302106 | 11/2006 |

OTHER PUBLICATIONS

Office Action dated Apr. 21, 2010 issued in the corresponding Chinese patent application No. 200810003283.X (English translation enclosed).

Office Action dated Aug. 25, 2009 from Japan Patent Office in corresponding JP application No. JP-2007-018225 (and English translation).

Office Action dated Mar. 23, 2011, from German Patent Office in corresponding DE application No. 10 2007 060 698.8 (and English translation).

* cited by examiner

|   | EVENT OF DROWSY DRIVER | COMMON WITH HABIT |
|---|---|---|
| 1 | CLOSE EYES FOR LONG TIME | |
| 2 | MOVE HEAD SUDDENLY | |
| 3 | TOUCH FACE WITH HAND | O |
| 4 | BLINK STRONGLY | O |
| 5 | YAWN | | ns maintaining apparatus and method of maintaining wakefulness

WAKEFULNESS MAINTAINING APPARATUS AND METHOD OF MAINTAINING WAKEFULNESS

CROSS REFERENCE TO RELATED APPLICATION

This application is based on Japanese Patent Application No. 2007-18255 filed on Jan. 29, 2007, the content of which is incorporated herein by reference in its entirety.

FIELD OF THE INVENTION

The present invention relates to a wakefulness maintaining apparatus and method of maintaining wakefulness.

BACKGROUND OF THE INVENTION

Conventionally, a wakefulness maintaining apparatus for maintaining wakefulness of people is suggested. The wakefulness maintaining apparatus is suitably used for maintaining a driver of a vehicle at an appropriate waking degree for driving the vehicle.

For example, a waking degree maintaining apparatus disclosed in U.S. Pat. No. 5,311,877 (corresponding to JP-5-92039-A) estimates a waking degree of a driver at first, and estimates a reaction time Rt corresponding to the waking degree. Next, a signal output threshold frequency Ns is set and an estimated reaction time Reeg (waking degree) is calculated. When the estimated reaction time Reeg exceeds the reaction time Rt, a frequency counter N is increased. When the frequency counter N exceeds the threshold frequency Ns, it is determined that a waking state is unusual, and a waking-down signal representing a reduction in the waking degree is output. When the waking-down signal is output, a stimulus having an awakening effect such as a sound, a vibration, a smell, and the like is output to the driver for a predetermined time.

When the stimulus having the awakening effect is supplied to the driver, it is required to supply the stimulus at an appropriate time so that the driver receives the stimulus without feeling uncomfortable. When the diver is surprised by receiving the stimulus suddenly or the driver is annoyed by the stimulus, the driving operation may be disturbed.

The waking degree maintaining apparatus is only designed to output the waking-down signal when the frequency counter N exceeds the threshold frequency Ns, and is not designed to supply the stimulus so that the driver receives the stimulus without feeling uncomfortable.

Alternatively, a wakefulness maintaining apparatus for a vehicle disclosed in JP-11-310053-A supplies a smell to the driver every one minutes when a reduction degree of a driver's attention exceeds a predetermined value. Additionally, when an average of a monotonous driving operation per unit time increases, the wakefulness maintaining apparatus supplies the smell at fluctuation intervals of 1/f after 5 minutes has elapsed since the last smell is supplied.

The present wakefulness maintaining apparatus is designed to restrict an uncomfortable feeling by controlling a time of supplying the smell. However, when the waking degree reduces significantly, the wakefulness maintaining apparatus may not restrict the reduction in the waking degree sufficiently.

In general, an estimated or detected waking degree is an average of a fluctuation of the waking degree for a predetermined time. Thus, in a case where the waking degree is low until the middle of the predetermined time and the waking degree returns to a high level at the end of the predetermined time, the driver receives the stimulus with the high waking degree. In the present case, the driver may be annoyed by the stimulus and may not understand why the stimulus is supplied.

Therefore, a wakefulness maintaining apparatus that can supply stimulus without making people feel uncomfortable is required.

SUMMARY OF THE INVENTION

It is therefore an object of the present invention to provide a wakefulness maintaining apparatus and/or a method of maintaining wakefulness.

According to a first aspect of the invention, a wakefulness maintaining apparatus includes an event detecting part, a drowsiness level determining part, a threshold setting part, a level range determining part, an event determining part, and a stimulus supplying part. The event detecting part detects an event related to a drowsiness of a person, in which the event includes at least one of an action, an appearance, and a biologic signal of the person, and a movement of a vehicle driven by the person. The drowsiness level determining part determines a drowsiness level of a person that changes in accordance with a strength of a drowsiness. The threshold setting part sets a threshold value to divide the drowsiness level into a first level range and a second level range, in which the first level range is equal to or lower than the threshold value and the second level range is higher than the threshold value. The level range determining part determines the level range of the drowsiness level determined by the drowsiness level determining part. The event determining part determines whether the event detecting part detects the event. The stimulus supplying part supplies a stimulus having an awaking effect to the person when the level range determining part determines that the drowsiness level is in the second level range and the event determining part determines that the event detecting part detects the event.

The present wakefulness maintaining apparatus supplies the stimulus having the awaking effect to the person when the drowsiness level is in the second level range and the event related to the drowsiness is detected. Thus, the stimulus is supplied to the person at a time corresponding to the person's subjectivity and feeling, and thereby the person is released from being surprised by receiving the stimulus suddenly. As a result, the person can receive the stimulus without feeling uncomfortable.

According to a second aspect of the invention, a wakefulness maintaining apparatus for maintaining a wakefulness of a person includes a drowsiness level determining part and a stimulus supplying part. The drowsiness level determining part determines a drowsiness level of the person that changes in accordance with a strength of the drowsiness. The stimulus supplying part supplies a stimulus having an awaking effect to the person when the drowsiness level is higher than a predetermined value and supplies no stimulus for a predetermined period since a last stimulus is supplied. The predetermined period is set to an increasing trend period when the drowsiness level is on an increasing trend and is set to a decreasing trend period when the drowsiness level is on a decreasing trend, in which the increasing trend period is shorter than the decreasing trend period.

In the present wakefulness maintaining device, when the drowsiness level is on the increasing trend, the stimulus is supplied at shorter intervals compared with a case where the drowsiness level is on the decreasing trend. Thereby, the person can return to a wakefulness state rapidly. In contrast, when the drowsiness level is on the decreasing trend, the stimulus is supplied at longer intervals compared with a case where the drowsiness level in the increasing trend. Thereby, the stimulus is restricted from being supplied to the person, who has already received the awaking stimulus and is struggling with drowsiness. As a result, the person is released from feeling uncomfortable by receiving a further stimulus.

According to a third aspect of the invention, a method of maintaining a wakefulness of a person includes: detecting an event related to a drowsiness of the person, in which the event includes at least one of an action, an appearance, and a biologic signal of the person, and a movement of a vehicle driven by the person; determining a drowsiness level that changes in accordance with a strength of a drowsiness; setting a threshold value to divide the drowsiness level into a first level range and a second level range, in which the first level range is equal to or lower than the threshold value and the second level range is higher than the threshold value; determining a level range of the drowsiness level; and generating a stimulus having an awaking effect when the drowsiness level is in the second level range and the event is detected.

In the present method, the stimulus is generated when the drowsiness level is in the second level range and the event related to the drowsiness is detected. Thus, the stimulus is generated at a time corresponding to the person's subjectivity and feeling, and thereby the person is released from being surprised by receiving the stimulus suddenly. As a result, the person can receive the stimulus without feeling uncomfortable.

BRIEF DESCRIPTION OF THE DRAWINGS

Additional objects and advantages of the present invention will be more readily apparent from the following detailed description of preferred embodiments when taken together with the accompanying drawings. In the drawings.

DETAILED DESCRIPTION OF THE PREFERRED EMBODIMENTS

Figure 1:
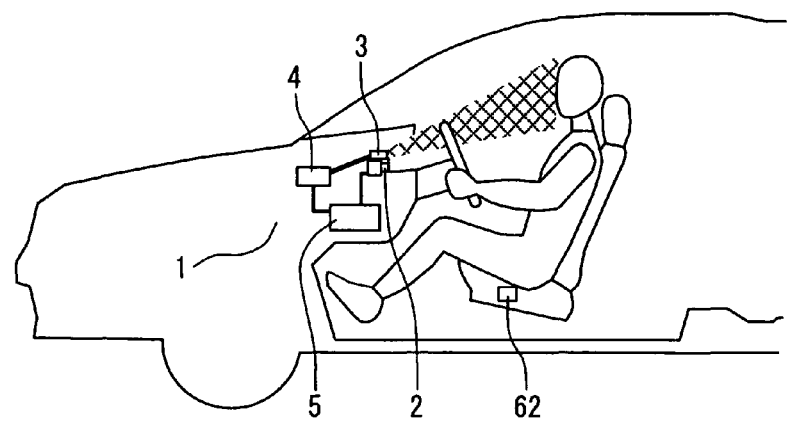
FIG. 1 is a schematic diagram of a wakefulness maintaining apparatus according to an embodiment of the invention.
Figure 2:
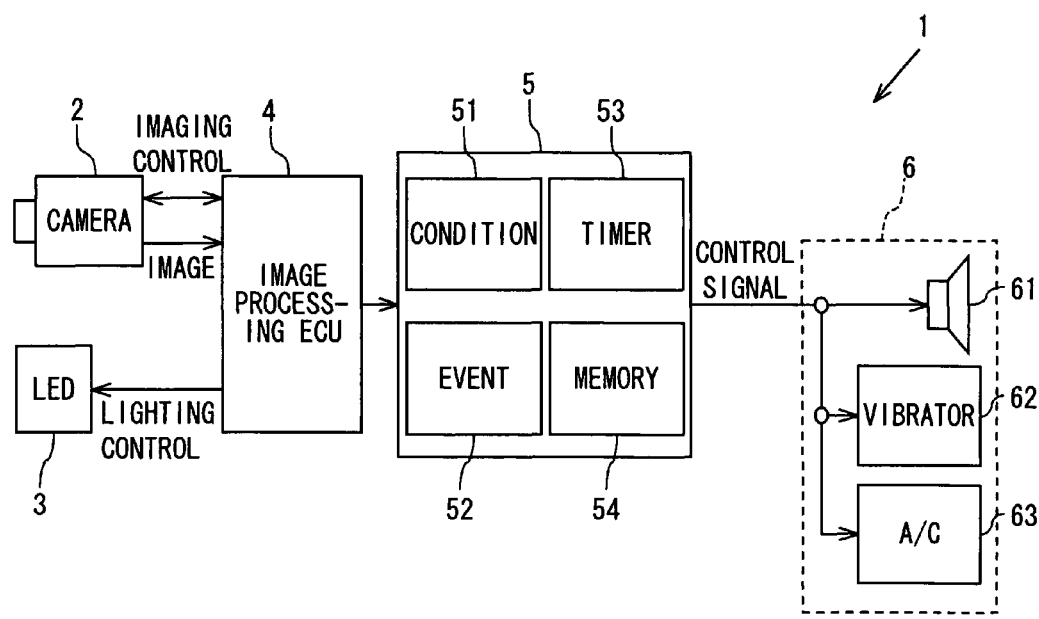
FIG. 2 is a block diagram showing components of the wakefulness maintaining apparatus.

Referring to FIG. 1, a wakefulness maintaining apparatus 1 according to an embodiment of the invention is shown as used for a vehicle, for example. The wakefulness maintaining apparatus 1 includes a camera 2, an LED 3, an image processing ECU 4, and a control device 5. The camera 2 is arranged in the vicinity of a dashboard of the vehicle and repeatedly takes an image of a driver above the chest, which is illuminated by a near infrared light emitted by the LED 3. For example, the camera 2 has a frame rate about in a rage from 30 to 60 fps.

The image processing ECU 4 controls the camera 2 and the LED 3. The image processing ECU 4 receives an image data from the camera 2, and temporarily stores the image date in a memory (not shown). Furthermore, the image processing ECU 4 reads the image date and performs an image recognition process to the image data. Then, the image processing unit ECU 4 generates processing date for determining a condition of the driver and an event such as an action and an appearance of the driver, and stores the processing date in another memory (not shown).

The control device 5 includes a condition determining part 51, an event determining part 52, a timer part 53, and a memory part 54. The condition determining part 51 determines the condition of the driver, for example, drowsiness, looking off, and drunkenness, based on the processing data provided from the image processing ECU 4. As for the drowsiness, the condition determining part 51 determines a drowsiness level that changes in accordance with a strength of drowsiness, based on a state of driver's eyes. The state of the driver's eyes includes a movement of eyes, an opening degree of eyelids, or a rate of blink, for example. The drowsiness level is divided into six stages (0 to 5) set in such manner that the drowsiness level is low when the drowsiness is weak and the drowsiness level is high when the drowsiness is strong.

Figure 3:
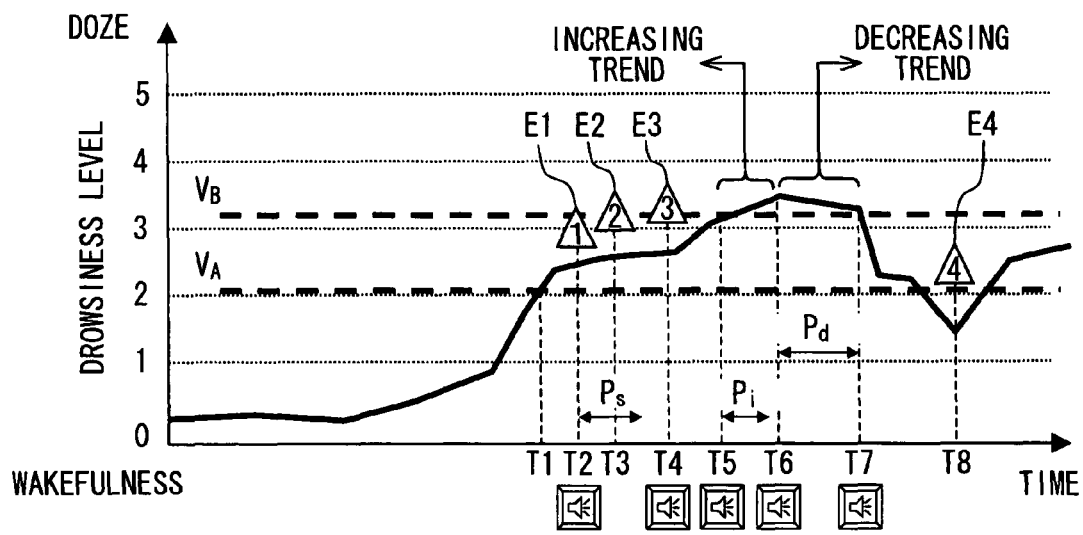
FIG. 3 is a graph showing relationships among a drowsiness level, an event, and a time of generating a warning.

Furthermore, the drowsiness level is divided into plural level ranges by a threshold value. In the present example, as shown in FIG. 3, a first threshold value $V_A$ and a second threshold value $V_B$ that is higher than the first threshold value $V_A$ are set so that the drowsiness level is divided into a first level range, a second level range, and a third level range. The first level range is equal to or lower than the first threshold value $V_A$, the second level range is higher than the first threshold value $V_A$ and is equal to or lower than the second threshold value $V_B$, and the third level range is higher than the second threshold value $V_B$.

When the drowsiness level is low and in the first level range, a stimulus having an awaking effect (awaking stimulus) is not supplied to the driver even when the event determining part 52 determines that an event related to drowsiness is detected. When the drowsiness level is intermediate and in the second level range, the awaking stimulus is supplied to the driver when an event related to drowsiness is detected. When the drowsiness level is high and in the third level range, the awaking stimulus is supplied to the driver even when any event related to drowsiness is not detected.

When the drowsiness level is in the first level range, it is difficult for the driver to feel drowsiness subjectively. Thus, the awaking stimulus is not supplied to the driver. Thereby, a situation where the driver cannot understand why the awaking stimulus is supplied is prevented.

When the drowsiness level is in the second level range, the driver feels drowsiness subjectively or starts to feel drowsiness. However, the drowsiness level is not high. Thus, the awaking stimulus is supplied to the driver at the time when the event is detected, and thereby the awaking stimulus is supplied at the time corresponding to the driver's subjectivity and feeling. As a result, a situation where the driver is surprised by receiving the awaking stimulus suddenly is prevented.

When the drowsiness level is in the third level range, a strong drowsiness is estimated and the driver is in a dangerous condition for driving the vehicle. Thus, the awaking stimulus is supplied to the driver even when any event is not detected, and thereby the drowsiness level is reduced.

When the drowsiness level is in the second level range or the third level range, the stimulus is not supplied for a predetermined period since the last awaking stimulus is supplied. For example, the predetermined period is selected from a second level range period $P_s$, an increasing trend period $P_i$, and a decreasing trend period $P_d$.

The second level range period $P_s$ is set as the predetermined period when the drowsiness level is in the second level range. When a first event E1 is detected and the awaking stimulus is supplied at time T2, the next awaking stimulus is not supplied for the second level range period $P_s$ from time T2. Thus, even when a second event E2 is detected at time T3 before elapsing the second level range period $P_s$, the awaking stimulus is not supplied. The next awaking stimulus is supplied when a third event E3 is detected at time T4 after elapsing the second level range period $P_s$. At time T1, even though the drowsiness level is higher than the first threshold value $V_A$, any event is not detected. Thus, the awaking stimulus is not supplied at time T1.

The increasing trend period $P_i$ is set as the predetermined period when the drowsiness level is in the third level range and the drowsiness level is on an increasing trend. When the drowsiness level is still increasing after the drowsiness level reaches the third level range and the awaking stimulus is supplied at time T5, the next awaking stimulus is not supplied for the increasing trend period $P_i$ from time T5.

The decreasing trend period $P_d$ is set as the predetermined period when the drowsiness level is in the third level range and the drowsiness level is on a decreasing trend. When the drowsiness level decreases after the awaking stimulus is supplied at time T6, the next awaking stimulus is not supplied for the decreasing trend period $P_d$ from time T6. Thus, when the decreasing trend period $P_d$ elapses at time T7, the next awaking stimulus is supplied. The decreasing trend period $P_d$ may be set in accordance with a decreasing rate of the drowsiness level. Specifically, a length of the decreasing trend period $P_d$ may be changed between a case where the drowsiness level decreases rapidly and a case where the drowsiness level decreases slowly.

A length of the second level range period $P_s$, the increasing trend period $P_i$, and the decreasing trend period $P_d$ may be set by the driver as a user. It is preferred that increasing trend period $P_i$ is shorter than the decreasing trend period $P_d$.

In the present case, when the drowsiness level is on the increasing trend, the awaking stimulus is supplied at shorter intervals compared with a case where the drowsiness level is on the decreasing trend. Thereby, the driver can return to the wakefulness state rapidly. In contrast, when the drowsiness level is in the decreasing trend, the awaking stimulus is supplied at longer intervals compared with a case where the drowsiness level in the increasing trend. Thereby, the awaking stimulus is restricted from being supplied to the driver, who has already received the awaking stimulus and is struggling with drowsiness, and the driver is released from feeling uncomfortable by receiving a further stimulus.

As described above, the awaking stimulus is not supplied for the predetermined period $P_s$, $P_i$, or $P_d$ after the last awaking stimulus is supplied. Thus, even when the drowsiness level of the driver is in the second level range or the third level range, the awaking stimulus is not supplied frequently but is supplied after the predetermined period $P_s$, $P_i$, or $P_d$ has elapsed. Thereby, the driver is released from feeling uncomfortable.

The event determining part 52 receives the processing data from the image processing ECU 4 and identifies the event from the processing data. The event determining part 52 further determines whether the identified event is related to drowsiness. The event determining part 52 determines whether or not the event related to drowsiness is detected. The memory part 54 stores data about the events related to drowsiness. For example, the event related to drowsiness includes items 1-5 in FIG. 8, i.e., closing eyes for long time, moving head suddenly, touching face with hand, blinking strongly, and yawning.

In the events, touching face with hand and blinking strongly are in common with driver's habits. Thus, each of the common events has identification information to be distinguished from events which are not in common with the driver's habits. The event determining part 52 determines whether or not the event related to drowsiness is in common with the driver's habit. When the event determining part 52 determines that the event related to drowsiness is in common with the driver's habit, the awaking stimulus is not supplied to the driver.

The timer part 53 counts an elapsed time since the last awaking stimulus is supplied. A stimulus output device 6 includes a speaker 61, a seat-vibrator 62, and an air-conditioner (A/C) 63, for example, for supplying the awaking stimulus to the driver. By receiving a control signal from the control device 5, the speaker 61 generates an alarm and/or voice, the seat-vibrator 62 vibrates a driver's seat, and the air-conditioner 63 decreases a temperature in a vehicle compartment and/or controls air volume.

When the drowsiness level of the driver changes as shown in FIG. 3, the wakefulness maintaining apparatus 1 supplies the awaking stimulus for warning the driver as described below. The drowsiness level changes in accordance with the strength of drowsiness, and the number of the drowsiness level increases as the strength of drowsiness increases. Specifically, the drowsiness level 0 expresses a wakefulness state, and the drowsiness level 5 expresses a dozing state. The first threshold value $V_A$ and the second threshold value $V_B$ are predetermined. When the drowsiness level reaches the first threshold value $V_A$ at time T1, a warning is required. However, the driver generally does not realize drowsiness in the present drowsiness level. If the wakefulness maintaining apparatus 1 generating the warning, e.g., the alarm, at time T1, the driver may not understand the meaning of the warning and may be confused. Thus, the warning is not generated at time T1.

When the drowsiness level exceeds the first threshold value $V_A$, the wakefulness maintaining apparatus 1 is in a standby state for warning. When the first event E1 is detected at time T2, the warning as the awaking stimulus is generated immediately. In the present case, the driver can understand the meaning of the warning and starts to struggle with drowsiness to be the wakefulness state. As described above, the event does not include a conscious action of the driver for struggling with drowsiness but includes an unconscious and spontaneous action of the driver, for example, yawning, closing eye for a long time, and bending down one's head due to relaxing of a neck muscle.

When the second event E2 is detected at time T3, the warning is not generated because the second level range period $P_s$ has not elapsed since the last warning is generated at time T2 and the driver may feel uncomfortable to receive the warning every time. When the third event E3 is detected at time T4, the warning is generated because the second level range period $P_s$ has elapsed. When the drowsiness level exceeds the second threshold value $V_B$, which is a dangerous drowsiness level, at time T5, the warning is generated regardless of the event.

The warning generated at time T5 may be same as that generated when the drowsiness level exceeds the first threshold value $V_A$. However, it is effective for changing volume and/or frequency of the alarm, for example. The warning is not limited to the alarm but may be smell, vibration, and/or wind.

At time T6, even though the event is not detected similarly with time T5, the drowsiness level is on the increasing trend. Thus, the warning is generated when the increasing trend period $P_i$ has elapsed from time T5. After time T6, the drowsiness level shows the decreasing trend. Thus, the warning is generated at time T7 when the decreasing trend period $P_d$ has elapsed since the trend of the drowsiness level changes from the increasing trend to the decreasing trend. At time T8, the second level range period $P_s$ has elapsed since the last warning is supplied, and the event is detected. However, the drowsiness level is under the first threshold value $V_A$. Therefore, the warning is not generated at time T8.

An operation process of the wakefulness maintaining apparatus 1 will now be described with reference to FIGS. 4-7. In general, people gradually become drowsy (average drowsiness) when people fall asleep. However, sometimes people suddenly become drowsy (sudden drowsiness). Thus, the wakefulness maintaining apparatus 1 repeats a sudden drowsiness process for restricting the sudden drowsiness and an average drowsiness process for restricting the average drowsiness simultaneously.

Figure 4:
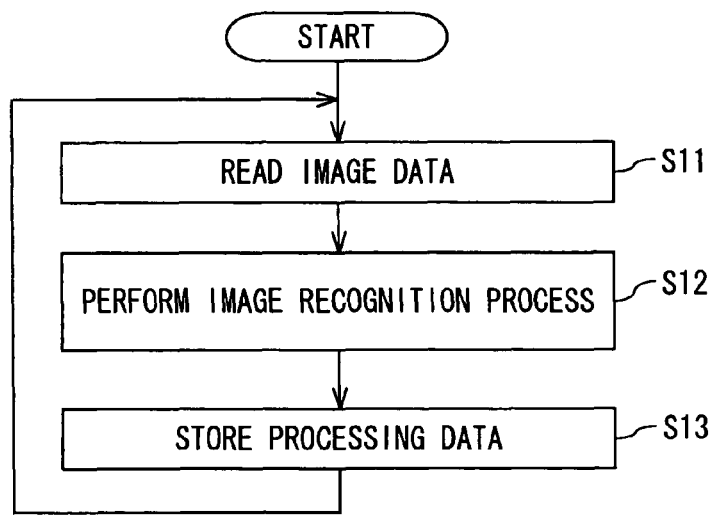
FIG. 4 is a flow diagram showing an image recognition process.

The image recognition process in FIG. 4 is performed repeatedly. The image data is read at S11 and the image recognition process is performed at S12. The processing data is stored in the memory at S13.

Figure 5:
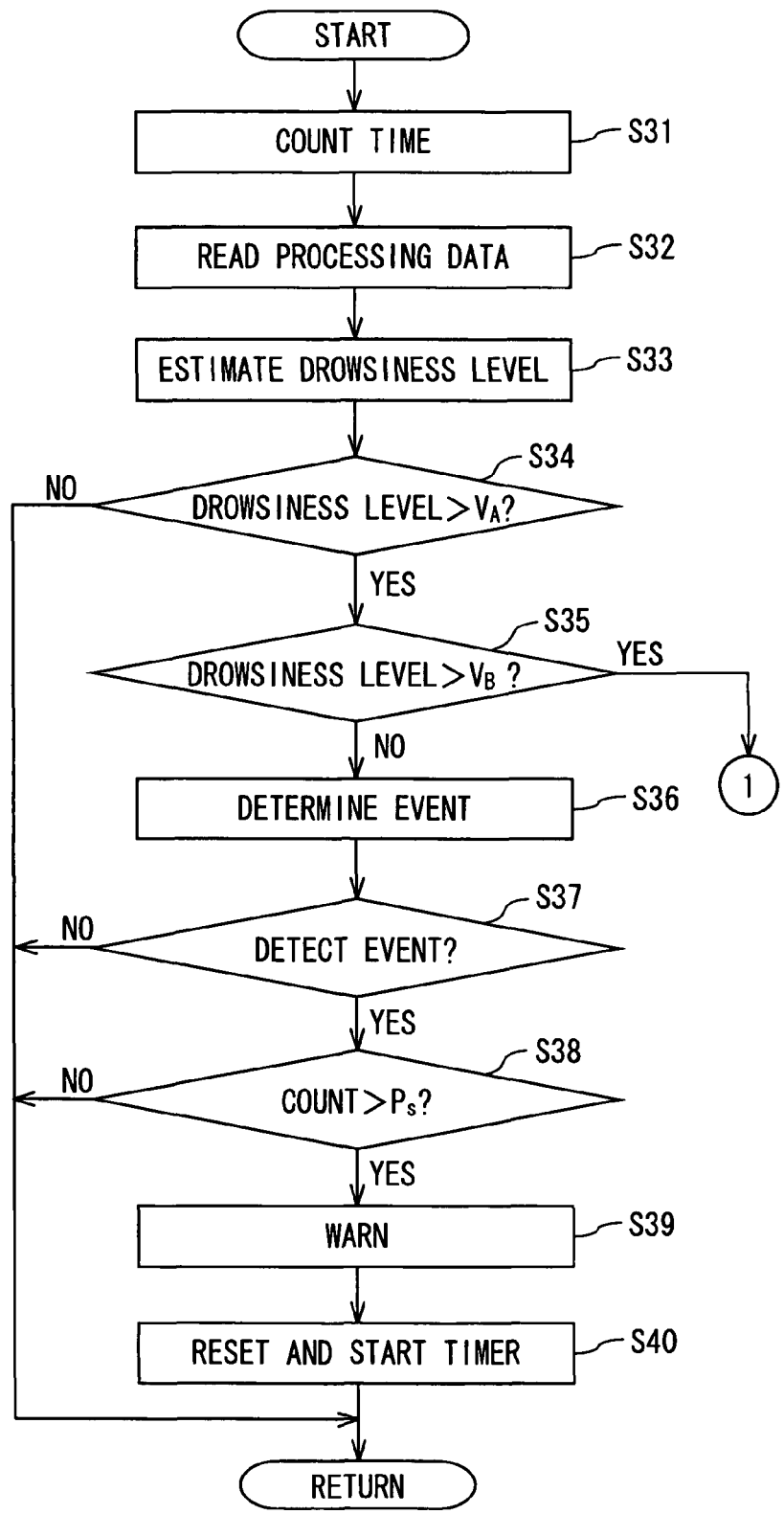
FIG. 5 is a flow diagram showing an average drowsiness process.
Figure 6:
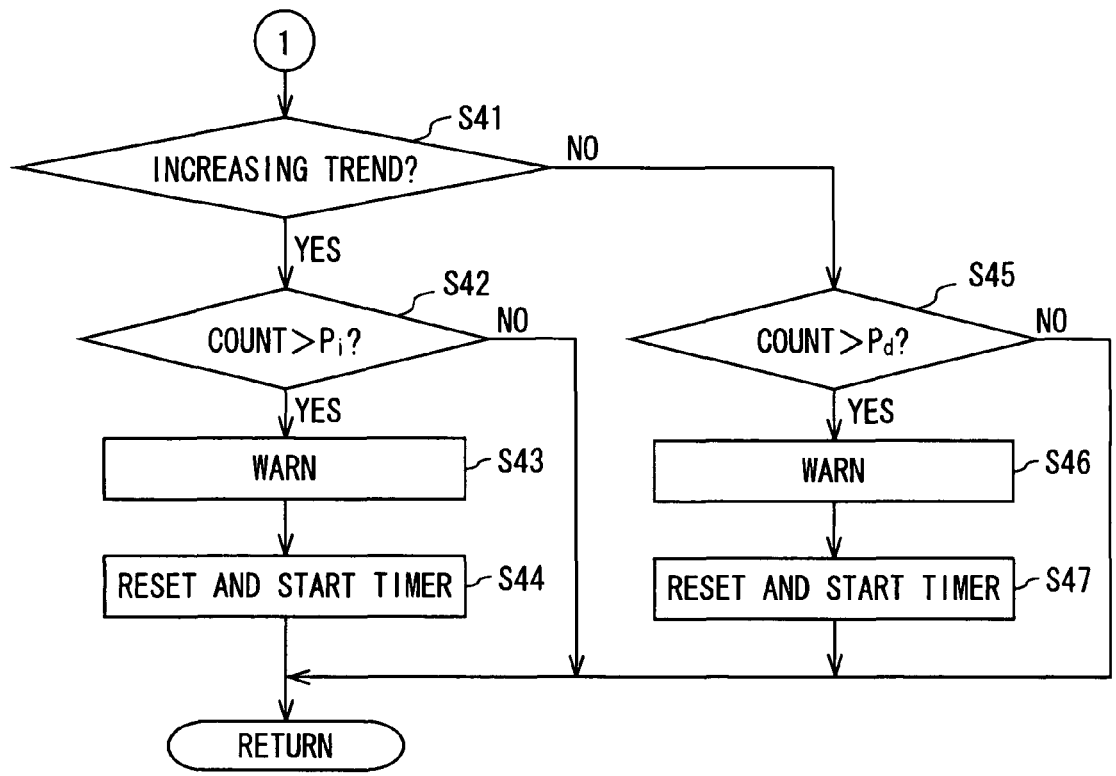
FIG. 6 is a flow diagram showing an average drowsiness process.
Figure 7:
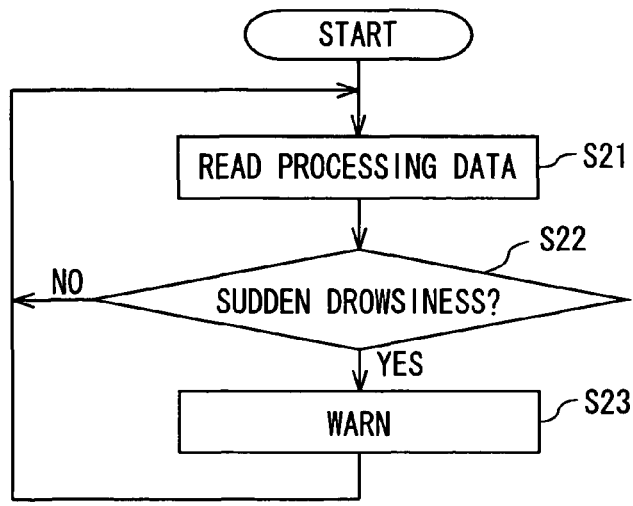
FIG. 7 is a flow diagram showing a sudden drowsiness process.

The sudden drowsiness process in FIG. 7 is continuously performed independently from the average drowsiness process in FIGS. 5 and 6. The processing data stored in the memory is read at S21. Then, it is determined whether or not the sudden drowsiness is detected at S22, based on a changing rate of the drowsiness level because the drowsiness level rapidly increases in the sudden drowsiness. If it is determined that the sudden drowsiness is detected (YES at S22), the warning as the awaking stimulus is generated at S23. When the sudden drowsiness is detected, it is determined that the driver is in a more dangerous state compared with a case where the event is detected. Thus, the warning is generated immediately. If it is determined that the sudden drowsiness is not detected (NO at S22), the process returns to S21, and the sudden drowsiness process is repeated.

In the average drowsiness process in FIG. 5, the timer part 53 starts to count the elapsed time at S31 and the processing data stored in the memory is read at S32. At S33, the drowsiness level is determined based on the state of the driver's eyes such as a movement of eyes, an opening degree of eyelids, and a rate of blink, for example. Specifically, the drowsiness level is estimated based on a moving average of a stored data of the drowsiness level, for example, for the last 30 to 60 seconds, which is continuously refreshed. At S34, it is determined whether or not the drowsiness level is higher than the first threshold value $V_A$. If it is determined that the drowsiness level is higher than the first threshold value $V_A$ (YES at S34), the process proceeds to S35. If it is determined that the drowsiness level is equal to or lower than the first threshold value $V_A$ (NO at S34), the present process ends, and the average drowsiness process is repeated.

At S35, it is determined whether or not the drowsiness level is higher than the second threshold value $V_B$. If it is determined that the drowsiness level is higher than the second threshold value $V_B$ (YES at S35), the process proceeds to S41 in FIG. 6. If it is determined that the drowsiness level is equal to or lower than the second threshold value $V_B$ (NO at S35), the process proceeds to S36. At S36, the event is detected from the image data of the last several to several hundred frames. At S37, it is determined whether or not the event is detected. If it is determined that the event is detected (YES at S37), the process proceeds to S38. If it is determined that the event is not detected (NO at S37), the present process ends, and the average drowsiness process is repeated.

At S38, it is determined whether or not the count of the timer part 53 is longer than the second level range period $P_s$. If the count is longer than the second level range period $P_s$ (YES at S38), the warning is generated at S39, and the timer part 53 is reset and started at S40. If the count is equal to or shorter than the second level range period $P_s$ (NO at S38), the present process ends, and the average drowsiness process is repeated.

At S41 in FIG. 6, it is determined whether or not the drowsiness level is on the increasing trend. The increasing trend and the decreasing trend can change frequently with respect to every frame. Thus, it is preferred that the trend of the drowsiness level is determined based on the average drowsiness level for several seconds to several tens of seconds. If the drowsiness level is on the increasing trend (YES at S41), the process proceeds to S42. If the drowsiness level is not on the increasing trend (NO at S41), the process proceeds to S45. At S42, it is determined whether or not the count of the timer part 53 is longer than the increasing trend period $P_i$. When the count is longer than the increasing trend period $P_i$, the warning is generated at S43 and the timer part 53 is reset and started at S44. When the count is equal to or shorter than the increasing trend period $P_i$, the present process ends and the average drowsiness process is repeated.

At S45, it is determined whether or not the count is longer than the decreasing trend period $P_d$. If the count is longer than the decreasing trend period $P_d$ (YES at S45), the warning is generated at S46 and the timer part 53 is reset and started at S47. If the count is equal to or shorter than the decreasing trend period $P_d$ (NO at S45), the present process ends, and the average drowsiness process is repeated.

As described above, the wakefulness maintaining device 1 sets the first threshold value $V_A$ and the second level range that is higher than the first threshold value $V_A$. In a state where drowsiness level is in the second level range, the awaking stimulus is supplied to the driver when the event such as the action and the appearance of the driver related to the drowsiness is detected.

Thus, the awaking stimulus is supplied to the driver at a time corresponding to the driver's subjectivity and feeling, and thereby the driver is released from being surprised by receiving the awaking stimulus suddenly. As a result, the driver can receive the awaking stimulus without feeling uncomfortable.

Other Embodiments

Figures 8, 9:
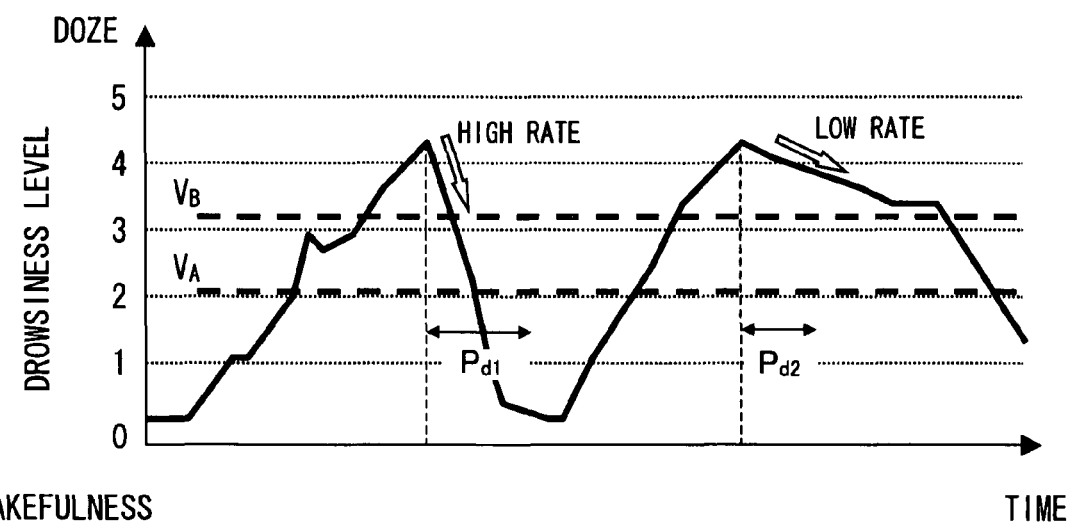
FIG. 8 is a table showing examples of an event of a drowsy driver.
FIG. 9 is a graph showing a relationship between a decreasing rate of a drowsiness level and a length of a decreasing trend period.

As shown in FIG. 9, a length of the decreasing trend period $P_d$ may be changed in accordance with a decreasing rate of the drowsiness level. Specifically, when the decreasing rate is high, a first decreasing trend period $P_{d1}$ is set, and when the decreasing rate is low, a second decreasing trend period $P_{d2}$ that is shorter than the first decreasing trend period $P_{d1}$ is set.

The event is not limited to the action and the appearance of the driver. The event may include a biologic signal of the driver such as a heart rate and a pulse rate or an irregular movement of the vehicle that is different from a movement occurring in accordance with a travel environment. Alternatively, a pressure sensor may be disposed in the driver's seat for detecting a change of a pressure distribution when the driver adjusts himself or herself on the driver's seat. The event according to the irregular movement is detected, for example, when a steering action is not preformed in accordance with a shape of a running load or when the vehicle in a no-passing zone deviates to a passing lane without an intention of avoiding an obstacle.

The control device 5 may inform the drowsiness level of the driver to an outside of the vehicle in addition to warning the driver by supplying the awaking stimulus. By informing the drowsiness level to the outside of the vehicle, the outside can take action based on the information. For example, when the information is sent to a traffic service control center, which controls a service of a taxi or a bus, a dispatcher can contact the driver. Alternatively, the information may be sent to a person on an adjacent vehicle by using a wireless, or turning on a headlight or a hazard light. Alternatively, the information may be automatically sent to a predetermined telephone of a home, a family, a friend, or an acquaintance of the driver.

The wakefulness maintaining apparatus 1 may be restricted from supplying the awaking stimulus when the driver has many driving tasks. Alternatively, the wakefulness maintaining apparatus 1 may be cooperated with a system for confirming safety of the surrounding environment and may fade in the awaking stimulus when the surrounding environment is not safe, so that the driver is released from being surprised by receiving the awaking stimulus suddenly.

Such changes and modifications are to be understood as being within the scope of the present invention as defined by the appended claims.

What is claimed is:

1. A wakefulness maintaining apparatus, comprising:
   a data capturing part that captures data corresponding to a drowsiness of a person;
   an event detecting part that detects an event related to the drowsiness of the person using the captured data of the data capturing part, wherein the event is an unconscious and spontaneous action and includes at least one of an action of the person, an appearance of the person, and a movement of a vehicle driven by the person;
   a drowsiness level determining part that determines a drowsiness level of the person using the captured data for a predetermined period, wherein the drowsiness level changes in accordance with an average strength of the drowsiness for the predetermined period;
   a threshold setting part that sets a threshold value to divide the drowsiness level into a plurality of level ranges, wherein the threshold value includes a first threshold value and the plurality of level ranges includes a first level range and a second level range divided by the first threshold value, the first level range is equal to or lower than the first threshold value and the second level range is higher than the first threshold value, the second level range is a range where a stimulus having an awaking effect is supplied to the person on condition that the event detecting part detects the event;
   a level range determining part that determines the level range of the drowsiness level determined by the drowsiness level determining part;
   an event determining part that determines whether the event detecting part detects the event; and
   a stimulus supplying part configured to be in a standby state when the level range determining part determines that the drowsiness level is in the second level range, the stimulus supplying part configured to supply the stimulus having the awaking effect to the person at a time when the event determining part determines that the event detecting part detects the event while the stimulus supplying part is in the standby state.

2. The wakefulness maintaining apparatus according to claim 1, wherein:
   the stimulus supplying part supplies no stimulus to the person when the level range determining part determines that the drowsiness level is in the first level range, even when the event detecting part detects the event.

3. The wakefulness maintaining apparatus according to claim 1, wherein:
   the threshold setting part further sets a second threshold value that is higher than the first threshold value, for defining a third level range; wherein:
   the second level range is equal to or lower than the second threshold value and the third level range is higher than the second threshold value; and
   the stimulus supplying part supplies the stimulus to the person when the level range determining part determines that the drowsiness level is in the third level range, even when the event detecting part detects no event.

4. The wakefulness maintaining apparatus according to claim 3, wherein:
   the stimulus supplying part supplies no stimulus for a predetermined time since a last stimulus is supplied to the person when the level range determining part determines that the drowsiness level is in one of the second level range and the third level range.

5. A wakefulness maintaining apparatus, comprising:
   an event detecting part for detecting an event related to a drowsiness of a person, wherein the event includes at least one of an action, an appearance, and a biologic signal of the person, and a movement of a vehicle driven by the person;
   a drowsiness level determining part for determining a drowsiness level of a person that changes in accordance with a strength of a drowsiness;
   a threshold setting part for setting a first threshold value to divide the drowsiness level into a first level range and a second level range, wherein the first level range is equal to or lower than the first threshold value and the second level range is higher than the first threshold value;
   a level range determining part for determining the level range of the drowsiness level determined by the drowsiness level determining part;
   an event determining part for determining whether the event detecting part detects the event;
   a stimulus supplying part for supplying a stimulus having an awaking effect to the person when the level range determining part determines that the drowsiness level is in the second level range and the event determining part determines that the event detecting part detects the event;
   wherein the threshold setting part further sets a second threshold value that is higher than the first threshold value, for defining a third level range;
   the second level range is equal to or lower than the second threshold value and the third level range is higher than the second threshold value;
   the stimulus supplying part supplies the stimulus to the person when the level range determining part determines that the drowsiness level is in the third level range, even when the event detecting part detects no event;
   the stimulus supplying part supplies no stimulus for a predetermined time since a last stimulus is supplied to the person when the level range determining part determines that the drowsiness level is in one of the second level range and the third level range;

wherein the predetermined period is set to an increasing trend period when the drowsiness level is increasing; and the predetermined period is set to a decreasing trend period that is longer than the increasing trend period when the drowsiness level is decreasing.

6. The wakefulness maintaining apparatus according to claim 5, further comprising:
a decreasing rate determining part for determining a decreasing rate of the drowsiness level; and
a period controlling part for controlling a length of the decreasing trend period in accordance with the decreasing rate.

7. The wakefulness maintaining apparatus according to claim 6, further comprising:
a memory part for storing an event related to a habit of the person that includes at least one of an action and appearance of the person; and
a habit determining part for determining whether the event detected by the event detecting part corresponds to the event stored in the memory part, wherein:
the stimulus supplying part supplies no stimulus to the person when the habit determining part determines that the event detected by the event detecting part corresponds to the event stored in the memory part, even when the level range determining part determines that the drowsiness level is in the second level range.

8. The wakefulness maintaining apparatus according to claim 1, wherein:
the stimulus supplying part provides information on the drowsiness level of the person to an outside of the vehicle when the stimulus supplying part supplies the stimulus to the person.

9. A wakefulness maintaining apparatus, comprising:
a drowsiness level determining part for determining a drowsiness level of a person that changes in accordance with a strength of the drowsiness; and
a stimulus supplying part for supplying a stimulus having an awaking effect to the person when the drowsiness level is higher than a predetermined value, wherein:
the stimulus supplying part supplies no stimulus for a predetermined period since a last stimulus is supplied;
the predetermined period is set to an increasing trend period when the drowsiness level is increasing and is set to a decreasing trend period when the drowsiness level is decreasing; and
the increasing trend period is shorter than the decreasing trend period.

10. The wakefulness maintaining apparatus according to claim 9, further comprising:
a decreasing rate determining part for determining a decreasing rate of the drowsiness level; and
a period controlling part for controlling a length of the decreasing trend period to be longer as the decreasing rate increases.

11. A method of maintaining a wakefulness of a person, comprising:
capturing data corresponding to a drowsiness of the person;
detecting an event related to the drowsiness using the captured data, wherein the event is an unconscious and includes at least one of an action of the person, an appearance of the person, and a movement of a vehicle driven by the person;
determining a drowsiness level of the person using the captured data for a predetermined period, wherein the drowsiness level changes in accordance with an average strength of the drowsiness for the predetermined period;
setting a threshold value to divide the drowsiness level into a plurality of level ranges, wherein the threshold value includes a first threshold value and the plurality of level ranges includes a first level range and a second level range divided by the first threshold value, the first level range is equal to or lower than the first threshold value and the second level range is higher than the first threshold value, the second level range is a range where a stimulus having an awaking effect is supplied to the person on condition that the event is detected;
determining a level range of the drowsiness level;
setting a standby state when the drowsiness level is determined to be in the second level range; and
generating the stimulus having an the awaking effect at a time when the event is detected while the standby state is set.

12. The method of according to claim 11, wherein:
no stimulus is generated when the drowsiness level is in the first level range, even when the event is detected.

13. The method of according to claim 11, further comprising:
setting a second threshold value that is higher than the first threshold value, for defining a third level range, wherein the second level range is equal to or lower than the second threshold value and the third level range is higher than the second threshold value; and
generating the stimulus when the drowsiness level is in the third level range, even when no event is detected.

14. The method of according to claim 13, wherein:
the generating the stimulus is restricted for a predetermined time since a last stimulus is generated when the drowsiness level is in one of the second level range and the third level range.

15. A method of maintaining a wakefulness of a person, comprising:
detecting an event related to a drowsiness, wherein the event includes at least one of an action, an appearance, and a biologic signal of the person, and a movement of a vehicle driven by the person;
determining a drowsiness level that changes in accordance with a strength of the drowsiness;
setting a first threshold value to divide the drowsiness level into a first level range and a second level range, wherein the first level range is equal to or lower than the first threshold value and the second level range is higher than the first threshold value;
determining a level range of the drowsiness level;
generating a stimulus having an awaking effect when the drowsiness level is in the second level range and the event is detected;
setting a second threshold value that is higher than the first threshold value, for defining a third level range, wherein the second level range is equal to or lower than the second threshold value and the third level range is higher than the second threshold value;
generating the stimulus when the drowsiness level is in the third level range, even when no event is detected;
the generating the stimulus is restricted for a predetermined time since a last stimulus is generated when the drowsiness level is in one of the second level range and the third level range;
the method further comprising determining a trend of the drowsiness level;
setting the predetermined period to an increasing trend period when the drowsiness level is increasing; and setting the predetermined period to a decreasing trend period that is longer than the increasing trend period when the drowsiness level is decreasing.

16. The method according to claim 15, further comprising:
determining a decreasing rate of the drowsiness level; and
controlling a length of the decreasing trend period to be longer as the decreasing rate increases.

17. A method of maintaining a wakefulness of a person, comprising:
detecting an event related to a drowsiness, wherein the event includes at least one of an action, an appearance, and a biologic signal of the person, and a movement of a vehicle driven by the person;
determining a drowsiness level that changes in accordance with a strength of the drowsiness;
setting a first threshold value to divide the drowsiness level into a first level range and a second level range, wherein the first level range is equal to or lower than the first threshold value and the second level range is higher than the first threshold value;
determining a level range of the drowsiness level; and
generating a stimulus having an awaking effect when the drowsiness level is in the second level range and the event is detected; further comprising
storing an event related to a habit of the person that includes at least one of an action and an appearance of the person; and
determining whether the detected event related to the drowsiness corresponds to the event related to the habit, wherein:
the supplying the stimulus is restricted when the detected event corresponds to the event related to the habit, even when the drowsiness level is in the second level range.

18. The method according to claim 11, further comprising:
outputting information on the drowsiness level of the person to an outside of the vehicle.

19. The wakefulness maintaining apparatus according to claim 1, wherein
the event is different from the drowsiness level.

20. The method according to claim 11, wherein
the event is different from the drowsiness level.

* * * * *